No. 737,087. PATENTED AUG. 25, 1903.
H. L. DE ZENG.
RETINOSCOPE.
APPLICATION FILED NOV. 16, 1901.
NO MODEL.
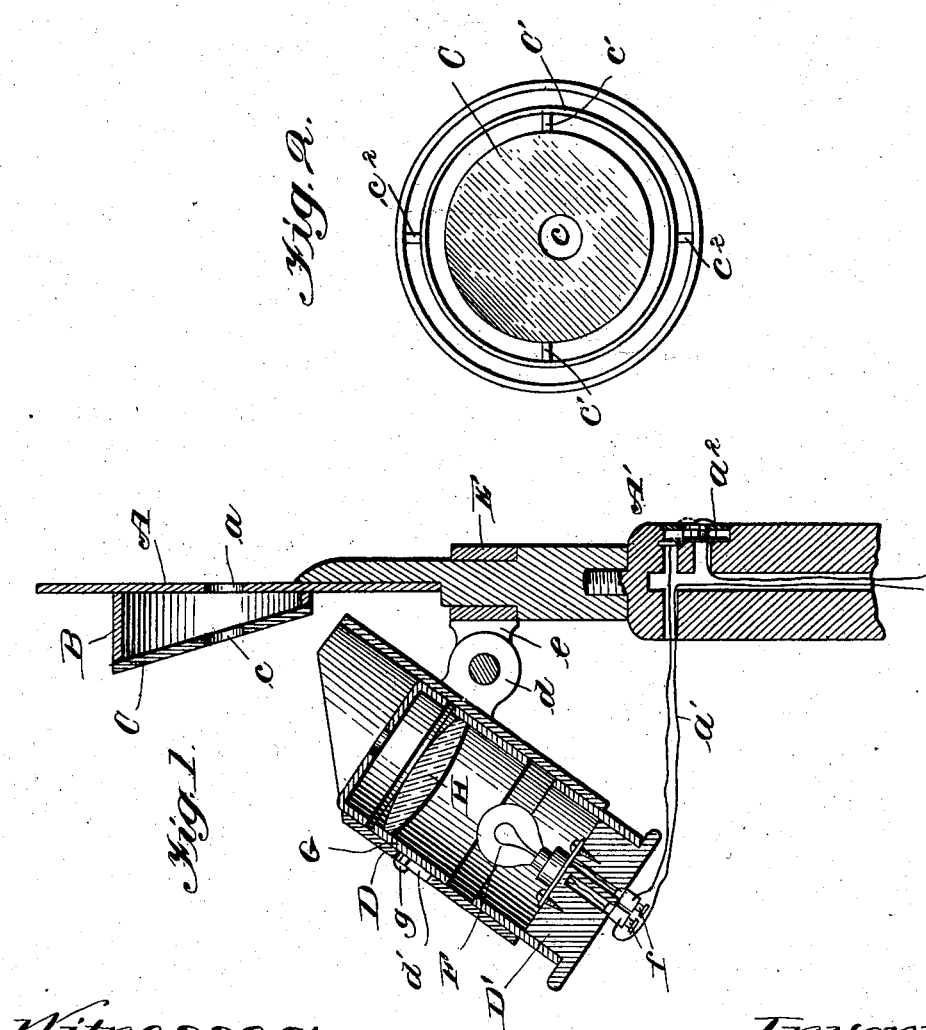

No. 737,087. Patented August 25, 1903.

UNITED STATES PATENT OFFICE.

HENRY L. DE ZENG, OF PHILADELPHIA, PENNSYLVANIA, ASSIGNOR OF ONE-FIFTH TO WALTER H. CHAMBERLIN, OF CHICAGO, ILLINOIS.

RETINOSCOPE.

SPECIFICATION forming part of Letters Patent No. 737,087, dated August 25, 1903.

Application filed November 16, 1901. Serial No. 82,492. (No model.)

*To all whom it may concern:*

Be it known that I, HENRY L. DE ZENG, a citizen of the United States, residing at Germantown, Philadelphia, county of Philadelphia, State of Pennsylvania, have invented a certain new and useful Improvement in Retinoscopes; and I declare the following to be a full, clear, and exact description of the same, such as will enable others skilled in the art to which it pertains to make and use the same, reference being had to the accompanying drawings, which form a part of this specification.

My invention has for its object the production of a hand-retinoscope which will carry its own source of light rather than depend on an independent source for illumination.

In the drawings, Figure 1 is a vertical section of my retinoscope. Fig. 2 shows a variation in the method of mounting the mirror.

In carrying out the invention A represents a suitable body portion, and A' a suitable handle, the two being engaged together in any suitable manner, the body portion being provided with the usual orifice $a$. Engaged to the body is a projecting flange B, and engaged thereto is the mirror C, having the usual orifice $c$.

D is a suitable casing having the projection $d$, which is pivoted in the ears $e$ of the collar E, the latter surrounding the handle A' and rotatable thereon. Engaged in the casing D in any desirable manner is an electric lamp F, with binding-posts $f$ for engaging the electric wires. I prefer to engage the lamp to a diapragm D', which engages and has an extended bearing in the end of the casing, so that the lamp can be adjusted toward and from the condensing-lens H, and the lamp may be made removable from its support, so that it can be easily replaced. In the casing is also a sleeve G, adjustable therein, it being provided with a projection $g$, extending through a slot $d'$ in the casing, so that the sleeve can be moved in the casing at will. In the sleeve is a condensing-lens H. The handle A' is bored longitudinally to receive the wires $a'$, and any suitable circuit-maker—as, for instance, the sliding switch $a^2$—is provided, so that the operator by moving the switch across the contacts completes the circuit and lights the lamp. A suitable diaphragm J, having the opening $j$, may, if desired, be provided in the casing D to control the emission of light, and by having diaphragms with various-sized openings the amount of light may be regulated.

Heretofore so far as I am aware in the use of retinoscopes the operator has been obliged in order to throw the light into the eye under examination to employ a suitable lamp or other source of illumination adjacent either to the subject's head or his own, but independent of both and of the retinoscope. Now in the practice of retinoscopy it is well known that the usual working distance between the eye under examination and the operator and retinoscope is one meter, and theoretically this distance is maintained while the operator places in the trial-frame before the subject's eye the necessary lenses to correct the ametropia of the eye under examination, this being of course determined by the fact that the reflex from the subject's eye either moves with the rotation of the retinoscope-mirror or against it; but in practice instead of maintaining the one-meter distance and changing the lenses until he has found the exact correction the operator moves his own eye and the retinoscope forward or backward until the shadow reverses and then puts in the necessary lens to bring the reversal-point to the one-meter distance. He thus quickly arrives at the desired conclusion; but in so doing he has destroyed the relative relation of distance between the three necessary points—viz., the light, the retinoscope, and the subject's eye—and thereby loses his illumination, and he must correct the light either by moving the lamp or adjusting the shade thereof. This is of course overcome by having the retinoscope carry its own source of illumination. Again, retinoscopy is usually practiced in a dark room, with a shaded lamp for the source of illumination. When the operator desires to secure from his test case of lenses a lens or to find any other object in the room, he must remove the lamp-shade, whereas with my improved instrument he has only to direct the light-rays of the retinoscope to any desired point. Again, where the shaded lamp is used the bundle of rays of light emitted through the small opening in the shade (usually from a quarter of an inch to one inch in diameter) is so small that it is very difficult to bring the retinoscope to the proper position with relation to the light and subject's eye to correctly direct the rays. The same difficulty arises when an uncovered source of light is used. Again, by bringing the light up to and causing it to be carried by the retinoscope a great saving in the candle-power of the light is accomplished. This reduction of candle-power has also the advantage of reducing the size of the point from which the light emanates, and consequently is more easily and effectively condensed and controlled. Again, owing to the compactness and portability of my device it can be easily carried into a hospital-room or other point away from the operator's room and used upon the subject's eye when the person is in other than an upright position.

Instead of making the mirror C stationary it might be adjustable, as shown in Fig. 2, it being mounted in a ring C' by the pivots $c'$ and the ring being mounted on the frame by the pivots $c^2$, so that the mirror is adjustable in any direction. Instead of the casing D being adjustably mounted on the handle A' it might be stationary thereon. So, also, instead of an orifice $c$ in the mirror the latter might be imperforate, and a portion corresponding to the opening $c$ might be made transparent, and by the term "opening" I mean any means for enabling the light to pass through. The mirror may be either flat or curved.

What I claim is—

1. In a portable retinoscope, the combination with the supporting means of a source of illumination carried thereby, a mirror also carried thereby adapted to reflect the light from the source of illumination, said mirror provided with means permitting the light to pass therethrough and a condenser between the source of illumination and the mirror.

2. In a portable retinoscope, the combination with the mirror thereof, of a casing connected to said mirror and a source of illumination in said casing the light from which is reflected by said mirror, both said mirror and casing carried by a handle that moves both simultaneously.

3. In a portable retinoscope, the combination of a body portion having a suitable handle, a mirror mounted thereon and carried thereby, means for permitting the light to pass through said mirror and body portion, a casing carried by the body portion said casing carrying an electric lamp the rays from which are directed against the mirror, and a condenser located between electric lamp and mirror.

4. In a portable retinoscope, the combination of a body portion having a suitable handle, a mirror mounted thereon and carried thereby, means for permitting the light to pass through said mirror and body portion, a casing carried by the body portion said casing carrying an electric lamp the rays from which are directed against the mirror, a condenser located between electric lamp and mirror, and a diaphragm provided with means for permitting the light to pass through and located between light and mirror.

5. In a portable retinoscope, the combination of a body portion having a suitable handle, a mirror mounted thereon and carried thereby, means for permitting the light to pass through said mirror and body portion, a casing carried by the body portion said casing carrying an electric lamp the rays from which are directed against the mirror, an adjustable condenser located between electric lamp and mirror, and a diaphragm located between the condensing-lens and mirror.

In testimony whereof I sign this specification in the presence of two witnesses.

HENRY L. DE ZENG.

Witnesses:
  GRACE B. HURLBUT,
  PERCY E. DROUGHMAN.